United States Patent [19]

Heier et al.

[11] Patent Number: 5,266,742
[45] Date of Patent: Nov. 30, 1993

[54] LONGITUDINAL WATER-TIGHT CABLE SLEEVE

[75] Inventors: Manfred Heier; Dieter Saegmuehl, both of Herdecke; Georg Boscher, Hagen; Hans J. Meltsch, Obering; Detlef Graefe, Hagen, all of Fed. Rep. of Germany

[73] Assignee: Siemens Aktiengesellschaft, Munich, Fed. Rep. of Germany

[21] Appl. No.: 846,572

[22] Filed: Mar. 5, 1992

[30] Foreign Application Priority Data

May 23, 1991 [DE] Fed. Rep. of Germany ....... 4116888

[51] Int. Cl.⁵ .............................................. H02G 15/04
[52] U.S. Cl. .................................. 174/93; 174/74 R; 174/75 R; 174/77 R; 174/82; 174/89; 174/92
[58] Field of Search ................ 174/93, 92, 76, 75 R, 174/77 R, 88 R, 885, 89, 74 R, 82

[56] References Cited

U.S. PATENT DOCUMENTS

| 3,373,243 | 3/1968 | Janowiak et al. | 174/89 |
| 4,507,008 | 3/1985 | Adl et al. | 174/89 |
| 4,795,230 | 1/1989 | Garcia et al. | 385/134 |
| 4,883,336 | 11/1989 | Bock et al. | 385/138 |

FOREIGN PATENT DOCUMENTS

| 0243234 | 10/1987 | European Pat. Off. |  |
| 0272806 | 6/1988 | European Pat. Off. |  |
| 2343076 | 3/1975 | Fed. Rep. of Germany | 174/93 |
| 3518654 | 11/1986 | Fed. Rep. of Germany |  |
| 3528130 | 2/1987 | Fed. Rep. of Germany | 174/93 |
| 3640695 | 6/1988 | Fed. Rep. of Germany |  |

Primary Examiner—Morris H. Nimmo
Attorney, Agent, or Firm—Hill, Steadman & Simpson

[57] ABSTRACT

A cable sleeve which is longitudinally water tight, includes a sleeve head which is composed of an outside member having an inner cavity which expands conically from one end towards the other end and an inside member which is introduced in the cavity and has an outside surface which is matched to the conical inside surface of the outside member so that when the two members are assembled, a conical annular gap is formed therebetween for holding leads of the cable in a fanned out manner. If the sleeve head is for a branch fitting, it will be constructed to receive two cables whose leads will both be fanned out in the gap between the inside and outside members, which gap also receives a small amount of sealing compound to form a water tight seal with the leads. The shape of the cavity and the outside surface of the inside member can be each conical or if the head is designed to receive more than one cable, it can have a flattened conical surface to form a flattened conical gap.

15 Claims, 2 Drawing Sheets

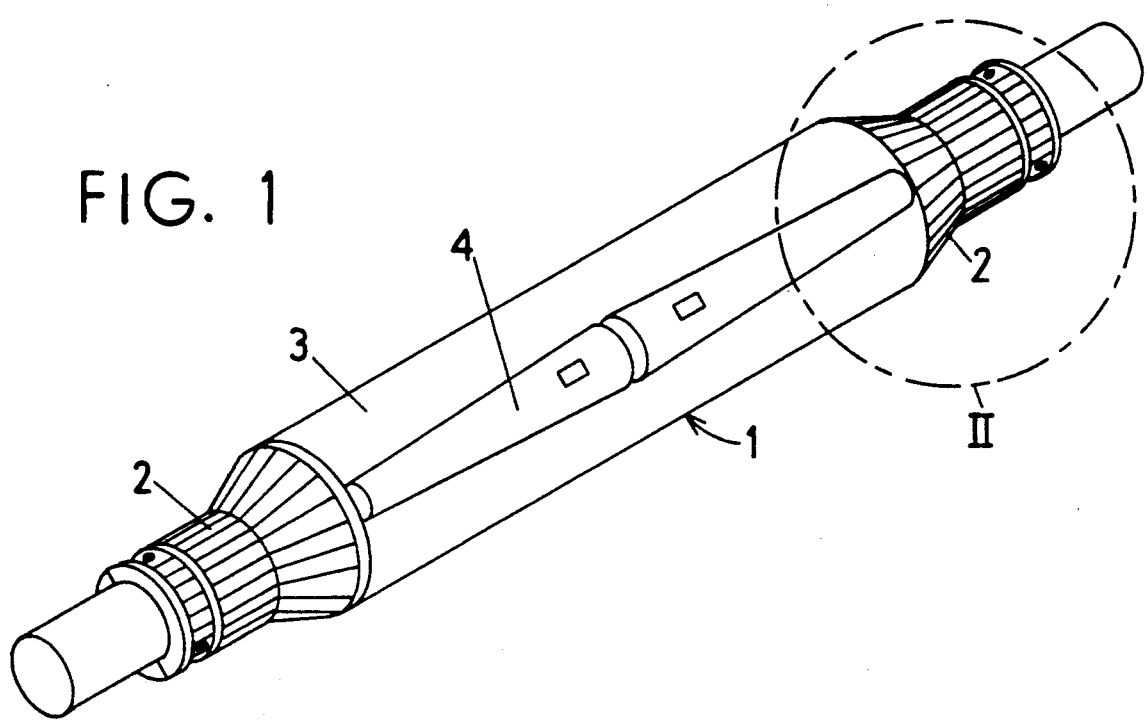
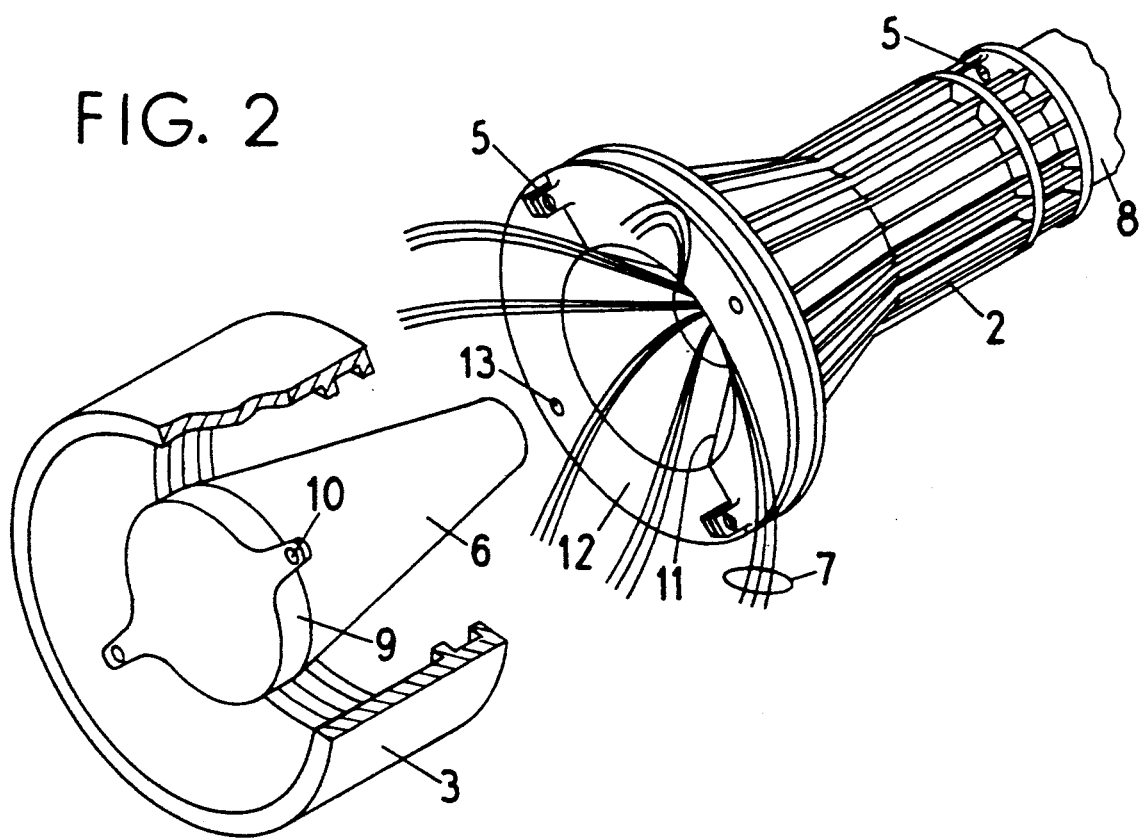

LONGITUDINAL WATER-TIGHT CABLE SLEEVE

BACKGROUND OF THE INVENTION

The invention is directed to a longitudinally water tight cable sleeve.

In longitudinally water tight sleeves, the entire splicing chamber is usually filled with a filling compound. This has the disadvantage that a great quantity of comparatively expensive filling compound is used and that this filling compound has difficulty penetrating into the spliced bundle so that the seal is relatively inadequate. Another disadvantage of such sleeves is that the splicing chamber must first be cleaned and cleared of the filling compound when the sleeve is re-opened and then must be refilled when the sleeve is re-closed.

German published application 35 18 654 discloses a method for mounting a branching sleeve to a high-tension cable wherein the quantity of the casting resins required for assembly is kept as low as possible. To accomplish this feature, the housing is composed of a shrinkable plastic which is employed as a casting form and the space inside of the housing is not filled with the casting resin until the housing has been shrunken to its smaller condition. The volume of the remaining cavity is thus reduced to such an extent by the shrinkage of the casting form that the need for casting resin required for filling of this shrunken cavity is minimized.

SUMMARY OF THE INVENTION

The object of the present invention is to create a longitudinally water tight cable sleeve that is suitable both as a through sleeve and also as a branching sleeve. The cable sleeve of the present invention can also be used as an end termination and it guarantees a reliable seal against the penetration of water given the lowest possible consumption of filling compound.

This object is achieved by a longitudinal water tight cable sleeve which comprises a sleeve head or end with every sleeve head being formed as an outside or outer member having an inner cavity which expands from the bore for receiving the insertion of the cable outward as it extends from this introduction point. The sleeve head also includes an inner member having a tapering outside surface which is matched to an inside surface of the outer member and this inner member in then introduced into the expanding interior cavity of the outer member to form a conical like annular gap wherein the leads of the cable are accepted after having been fanned out or spread basket-like. A predetermined quantity of filling compound is then introduced before the inner member is introduced into the cavity of the outer member and can be pressed into the region of the leads of the cable by the introduction of the inner member.

It is an important part of the invention that the volume to be filled with the filling compound is extremely small due to the formation of the annular gap being limited by the inside and outside members and in which the leads fanned basket-like are situated. Another important advantage is that due to the insertion of the inside member into the outside member, the filling compound is pressed so that all individual leads are completely surrounded and thus sealed. Thus, the degree of filling of the cable or of the cables and thus the sealing is enhanced at the same time due to a defined quantity of filling compound being pressed into the cable core.

The outside member is advantageously composed of two half-members whose parting surface corresponds to a radial surface or plane that extends radially to an axis of the outside member. The outside member can thus be easily placed over cut and over uncut cables.

The outside member is preferably manufactured of a transparent material so that a visual check of the filled condition can be possible.

Given a sleeve on whose ends two identical outside members are provided, these are preferably tightly joined to one another by a socket pipe of a known type that will surround the splicing space.

The outside member is advantageously constructed so that it simultaneously forms sleeve heads or ends of the cable sleeve.

For forming a branching sleeve, i.e., a sleeve wherein at least two sleeve heads enable the introduction of at least two cables, the present invention is provided in a development of that the outside member will have two bores extending from one end which both bores expand conically and a separate inside member having correspondingly fashion conical outer surfaces. Instead, however, the outside member can also be employed in a branching sleeve whose interior has the shape of a cone flattened towards two opposite sides so the allocated inside member will have a conical outside surface flattened in a corresponding way.

The inside member preferably has flanged webs which can be used to secure the inside member on the outside member on a base side of the inside member.

It can also be provided that a ring composed of a glue-like compound is applied on the inside member and this ring will fix the leads of the cable and seal the annular gap from the splicing location.

Finally, connecting rails can be attached to the inside members. These rails serve as assembly aids and/or the purpose of defining the dimensions of the cable offset and also the purpose of permanently fixing the inside members relative to each other.

Other advantages and features of the invention will be readily apparent from the following description of the preferred embodiments, the drawings and claims.

BRIEF DESCRIPTION OF THE DRAWINGS

FIG. 1 is a perspective view of a cable sleeve of the present invention;

FIG. 2 is an enlarged exploded perspective view of the portion of the cable sleeve contained in the chain lines II of FIG. 1;

DESCRIPTION OF THE PREFERRED EMBODIMENTS

Figure 3:
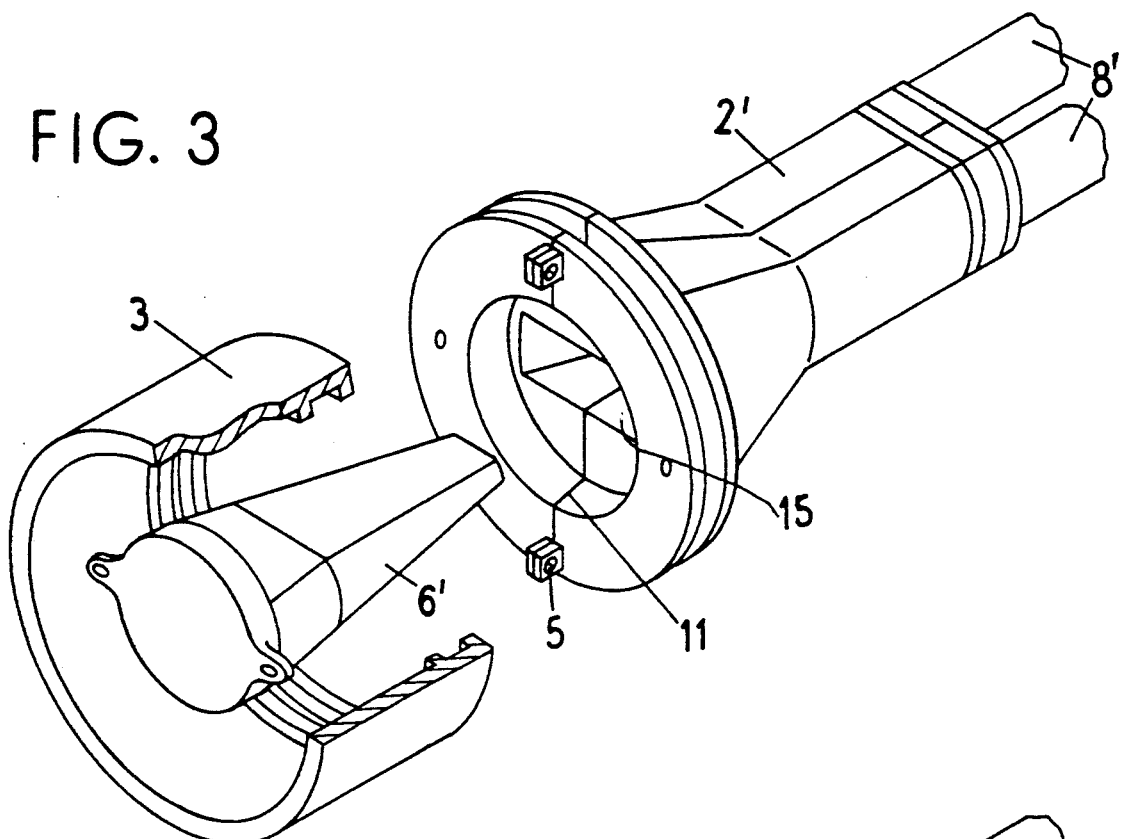
FIG. 3 is an enlarged exploded perspective view similar to FIG. 2 of an embodiment of the sleeve head in accordance with the present invention.

The principles of the present invention are particularly useful when incorporated in a cable sleeve generally indicated at 1 in FIG. 1. The cable sleeve is composed of two sleeve heads 2 and of a socket pipe 3 that joins the sleeve heads together and hermetically seals the splicing space that it surrounds. The socket pipe 3 is slotted along a generated line so it can be easily placed over the splicing space. After the pipe is put in place, it is closed by closing rails 4 of a known design.

As is illustrated in greater detail in FIG. 2, the sleeve head 2 is composed of a member referred to as an outside member that has an inner bore at one end receiving a cable 8 which inner bore expands outwardly in a funnel shape manner so as to form a conical or enlarged inner cavity with an inside surface.

It should be pointed out that the outside member need not be necessarily identical to the sleeve head. On the contrary, it can also be conceivable that the outside member is introduced into a correspondingly shaped sleeve head.

In the illustrated embodiment, the outside member 2 is divided along a radial plane 11 which extends through the axis of the member 2 on a radial thereof. Therefore, the member 2 is thus composed of two half members that are joined to one another by screw-type connections 5.

Figure 5:
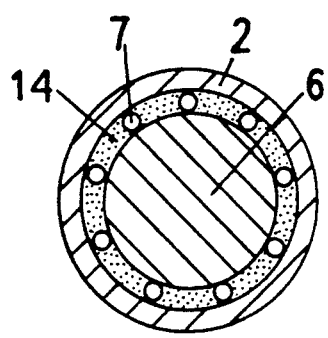
FIG. 5 is a transverse cross sectional view of the annular gap between the inside member and cavity of the outside member.

The sleeve head of the present invention also includes an inside member 6 having a conical outside surface that can be introduced into the conical cavity of the outside member 2. The conical outside surface of the inside member 6 is designed in dimension so that after introduction into the outside member 2, it forms with the outside member a conical annular gap which receives a filling compound 14 (see FIG. 5) and which gap will receive the offset leads 7 of the cable 8 which enter into the outside member and are accepted in the conical annular gap. To this end, the leads 7 (see FIG. 2) have been fanned or spread open in a basket-like manner so that they can be arranged in the annular gap and in an ordered sequence. A ring 9 composed of a sealing compound such as an adhesive material or glue-like compound is arranged in an annular channel that is provided in the region adjacent a base side of the inside members 6. The leads 7 are capable of being fixed at this sealing compound and the sealing compound seals the annular gap from the splicing space.

Two flange webs 10 are provided with bore holes and are also situated on the base side of the inside member 6. Corresponding bores 13 are provided on a flange 12 of the outside member and thus when the inside member is positioned in the cavity of the outside member, it can be locked or held in place by threaded fasteners extending through the bores of the flange webs 10 and entering the threaded bores 13.

In assembling the sleeve head onto a cable, the two parts of the outside member 2 are secured on a cable which has been stripped in its end region. A ring of sealing compound is thereby placed around the cable cladding and this effects a seal when the two halves of the outside member 2 are joined with the assistance of the screws.

The leads are then fanned out open-like over the conical inside surface of the outside member 2. Subsequently, the inside of the outside member is filled with a cable filling compound up to a predetermined level. After this, the inside member 6 is pressed into the interior of the outside member and is secured to the flange 12 with screws. The ring 9 of the sealing compound provided on the inside member 6 thereby will effect a fixing of the leads 7 and prevent a penetration of moisture into this splicing space. When both the outside members have been attached to the appertaining cable ends in this way, the leads have been joined to one another in the provided way, a socket pipe 3 that joins the two outside members 2 to one another and hermetically seals the space between them is attached. As illustrated, the socket member 3 has inwardly extending flanges which are received in an outwardly opening groove on the outside member 2.

The outside member 2 shown in FIGS. 1 and 2 simultaneously forms the actual sleeve head and is preferably transparent so that the filling level of the filling compound can be easily observed. The work expended during the assembly is thereby further reduced.

The ribs visible in the drawings that proceed in the direction of generated lines on the outside surface of the outside member 2 serve first the purpose of reinforcing the outside member and also will form a decorative element.

An embodiment of the sleeve head is illustrated in FIG. 3 and includes an outside member 2′, which can accept two cables 8′ for a branching sleeve. The opposite end region of the outside member 2′ widens funnel-like, limits and forms a conical cavity 15 whose cross-section differs from the exemplary embodiments of FIGS. 1 and 2 because it is not circular but has an oval cross-section. In an adaptation to this inside cavity of this outside member 2′, the outside surface of the inside member 6′ forms a cone which is flattened on two opposite sides so together with the inside surface of the outside member 2′, it again forms an annular gap, however, this gap does not have a circular cross-section, but an oval cross-section in this example. The leads which are not illustrated, of the two cables 8′ are accepted in this annular gap in a spread apart manner. The exemplary embodiment of FIG. 3 corresponds to the exemplary embodiment set forth with reference to FIGS. 1 and 2 in terms of all other details.

Figure 4:
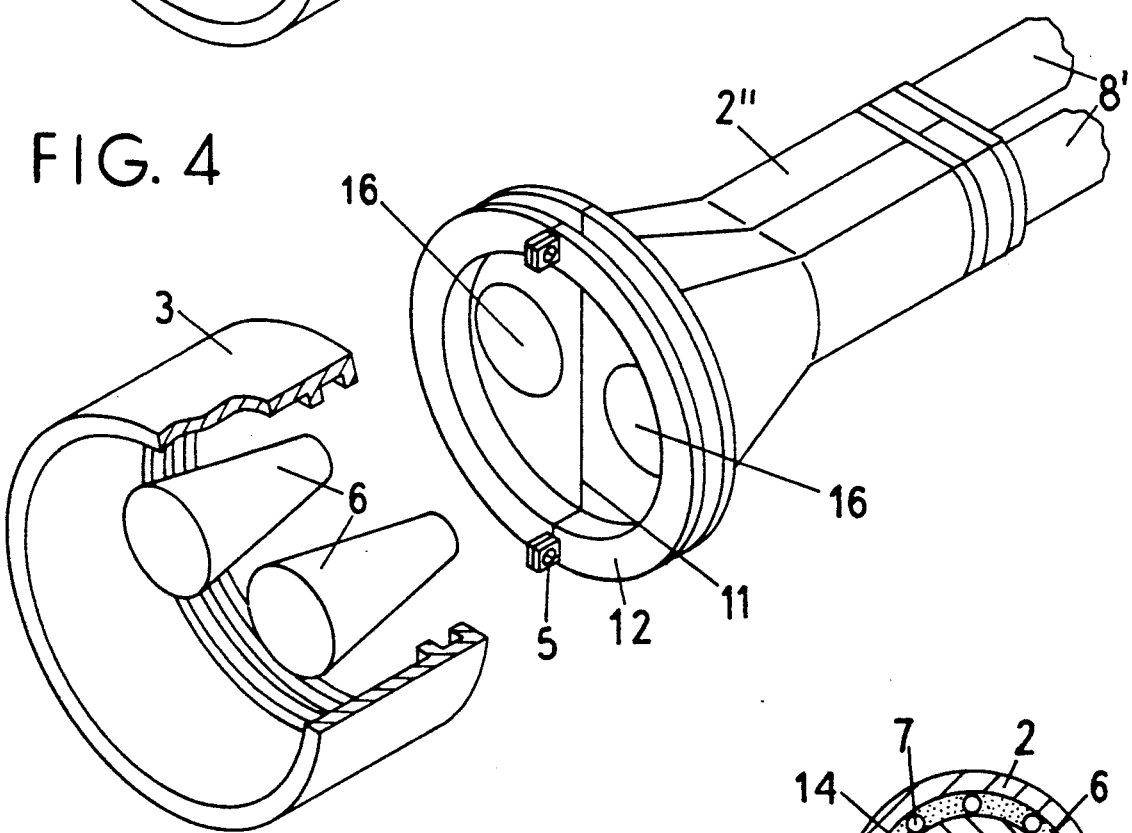
FIG. 4 is an enlarged exploded perspective view similar to FIG. 2 of another embodiment of the sleeve with the outside member having two conical cavities with cooperating cones.

In the embodiment of FIG. 4, the outside member 2″ has two bores to receive two cables 8′. As each bore approaches the opposite end, the bore expands into a conical cavity 16. Each cavity 16 receives a separate conical inside member 6.

Although various modifications may be suggested by those versed in the art, it should be understood that we wish to embody within the scope of the patent granted hereon, all such modifications as reasonably and properly come within the scope of our contribution to the art.

We claim:

1. A cable sleeve which is longitudinally water tight, said sleeve including a sleeve head being formed by an outside member having a first end, a second end and a bore at said first end for receiving a cable, said bore expanding outwardly as it approaches the second end of the outside member to form an inner cavity with an inside surface, an inside member having an outside surface matched to the inside surface of the outside member, said inside member being introduced into the inner cavity of the outside member to form a conically angular gap for receiving leads of a cable which leads have been spread out, said annular gap also receiving a predetermined quantity of filling compound which is introduced into the inner cavity prior to introduction of the inner member to form a water tight seal with the leads disposed in said gap.

2. A cable sleeve according to claim 1, said cable sleeve including two identical sleeve heads being provided at the end of the sleeve, said sleeve heads being tightly connected to one another by a socket pipe surrounding a splicing space disposed therebetween.

3. A cable sleeve according to claim 2, which cable sleeve is designed as a branching sleeve, at least one of the outside members being structured for the introduction of two cables, each cable being received in a bore of the outside member, said bores expanding in a cone shaped manner from the first end to the second end to form at least two cavities having a cone shaped inside surface, said inside member having a corresponding fashion conical outside surface being allocated to each said two cavities.

4. A cable sleeve according to claim 2, wherein the cable sleeve is designed as a branching sleeve, at least one outside member of the two sleeve heads enabling the introduction of two cables, said one outside member having an inside cavity having the shape of a cone flattened toward two opposite sides, and said inside member having a correspondingly flattened conical outside surface so that the gap between the inside member and outside member has an oval cross-section.

5. A cable sleeve according to claim 2, wherein the inside member on a base end has flanged webs, said outside member having a flange on said second end, said flanged webs being secured to said flange of the outside member to hold the inside member in a fixed position therein.

6. A cable sleeve according to claim 2, wherein the inside member adjacent a base side has a ring composed of a glue-like compound, said leads of the cable being capable of being fixed in said glue-like compound as the inside member is mounted in the outside member.

7. A cable sleeve according to claim 2, wherein each outside member is composed of two half members joined together on a parting surface corresponding to a radial surface of the outside member.

8. A cable sleeve according to claim 2, wherein each outside member is composed of a transparent material.

9. A cable sleeve according to claim 1, which is a branching sleeve having a sleeve head composed of an outside member enabling the introduction of two cables, said outside member having at least two cavities having cone shaped inside surfaces fashioned therein, the inside member having a corresponding fashioned conical outside surface allocated for each of said two cavities.

10. A cable sleeve according to claim 1, wherein the cable sleeve is a branching sleeve and the outside member of the sleeve head enables the introduction of at least two cables, the inside of said outside member having a shape of a cone flattened on two opposite sides and the inside member having a correspondingly flattened conical surface so that the conical gap has an oval cross-section.

11. A cable sleeve according to claim 10, wherein said outside member is formed of two half members having a parting surface corresponding to a radial surface of the outside member.

12. A cable sleeve according to claim 1, wherein the outside member has a flange along the second end, said inside member having flanges webs adjacent a base side, said flanged webs being connected to the flange of the outside member to hold the inside member in a fixed relationship in the outside member.

13. A cable sleeve according to claim 1, wherein the inside member has a ring composed of a glue-like compound positioned on a base end of said inside member, said compound being capable of fixing each of the cable leads in a fixed position in said head.

14. A cable sleeve according to claim 1, wherein the outside member is composed of two half members whose parting surface corresponds to a radial surface of the outside member.

15. A cable sleeve according to claim 1, wherein the outside member is composed of a transparent material.

* * * * *